United States Patent [19]

Deigman

[11] Patent Number: 5,564,486
[45] Date of Patent: Oct. 15, 1996

[54] ADJUSTABLE VIEW-SHIELDING DEVICE

[76] Inventor: Jeffrey J. Deigman, 17624 1st Ave. S. A-302, Seattle, Wash. 98148

[21] Appl. No.: 412,542

[22] Filed: Mar. 29, 1995

[51] Int. Cl.⁶ ............................... E06B 3/48; E05D 15/26
[52] U.S. Cl. ............................ 160/113; 160/210; 16/271
[58] Field of Search ................................ 160/113, 117, 160/214, 204, 210, 206; 49/366; 16/271; 379/451, 437

[56] References Cited

U.S. PATENT DOCUMENTS

| | | | |
|---|---|---|---|
| 130,248 | 8/1872 | Seymour | 16/271 |
| 184,375 | 11/1876 | Hansen | 160/210 |
| 292,416 | 1/1884 | Decombe | 160/210 |
| 828,762 | 8/1906 | Moreaux | 160/117 |
| 2,296,144 | 9/1942 | Cohen | 16/362 |
| 2,923,027 | 2/1960 | Bury | 160/117 |
| 5,080,160 | 1/1992 | Gephart et al. | 160/206 |
| 5,301,230 | 4/1994 | Barry | 379/447 |
| 5,353,349 | 10/1994 | Brown | 379/450 |

FOREIGN PATENT DOCUMENTS

| | | | |
|---|---|---|---|
| 4023547 | 1/1992 | Japan | 379/437 |
| 0391203 | 4/1933 | United Kingdom | 160/117 |

Primary Examiner—Blair Johnson
Assistant Examiner—Curtis A. Cohen
Attorney, Agent, or Firm—Dean A. Craine

[57] ABSTRACT

A view-shielding device for a machine designed to block the view of the machine's keypad or view screen by others positioned behind or adjacent to the user. The device includes two planar screens pivotal attached on the machine's front surface on opposite sides of the keypad or viewing screen. The screens, which are made of rigid, opaque material, are aligned vertically over the front surface of the machine. The screens are attached along their inside longitudinal edges to the front surface via hinges which enable the screens to pivot on the front surface approximately 180 degrees. By adjusting the relative positions of the screens on the front surface, the view angle of the keypad or viewing screen by others positioned behind or adjacent to the user may be blocked. In one embodiment, each screen includes a first panel structure. In an alternative embodiment, each screen includes a first panel structure and a second panel structure pivotally attached along their adjoining longitudinal edges. In still another embodiment, the hinges affixed to the machine are replaced with sliding hinges which enable the screens to slide horizontally over the front surface of the machine.

11 Claims, 2 Drawing Sheets

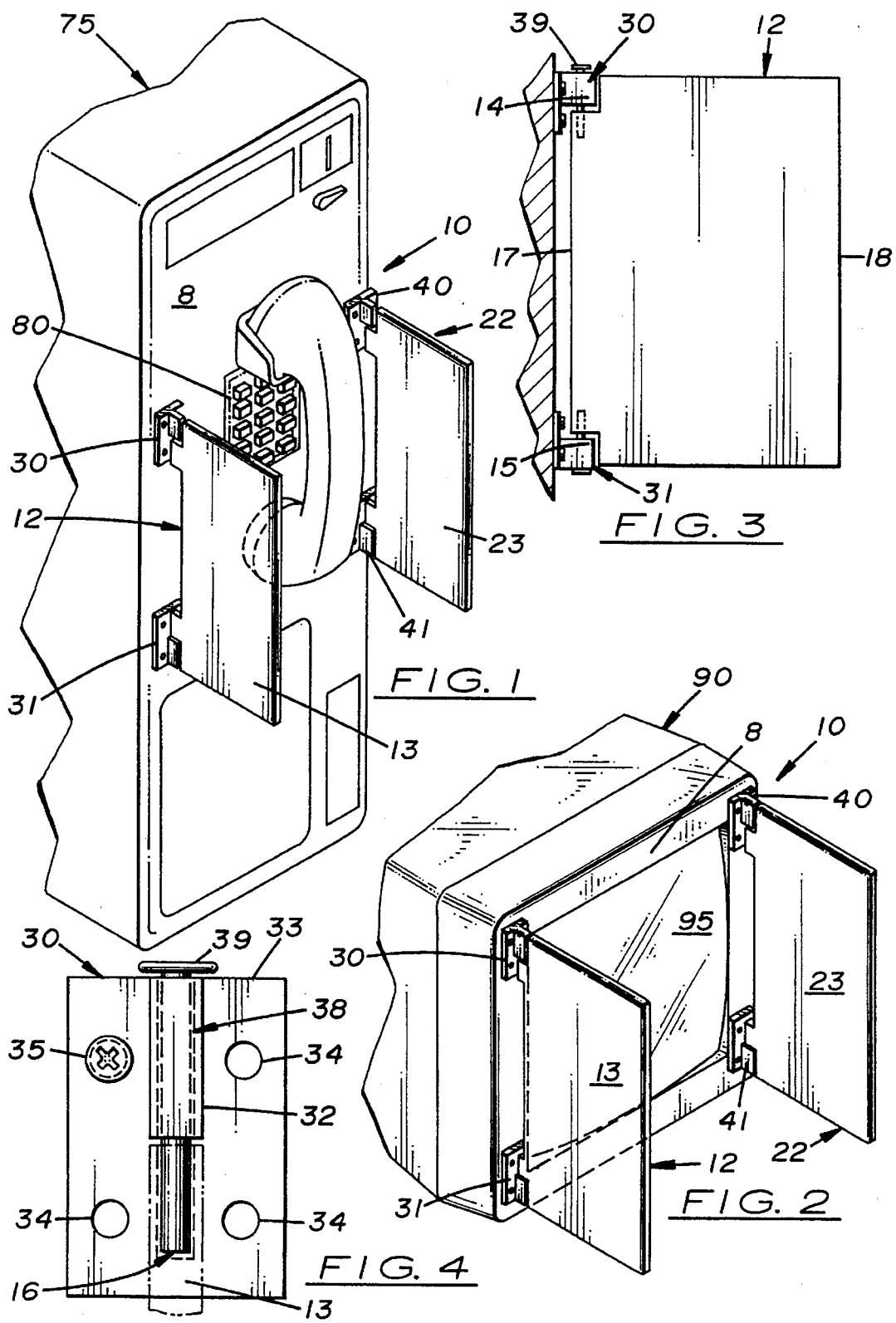

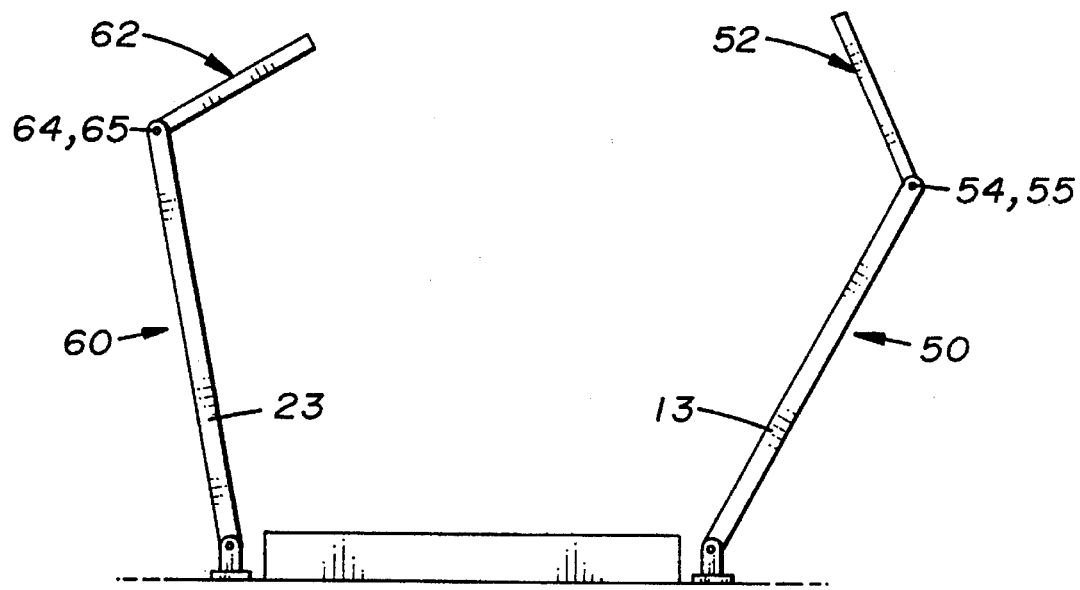
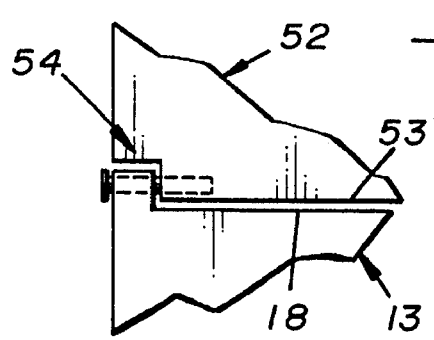
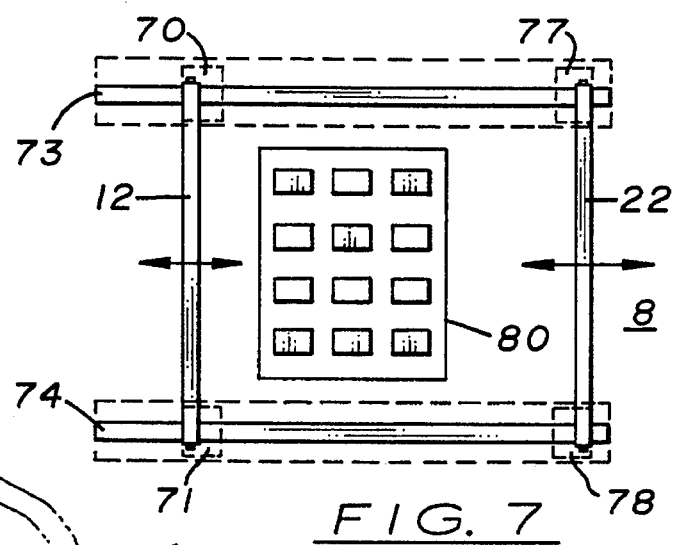
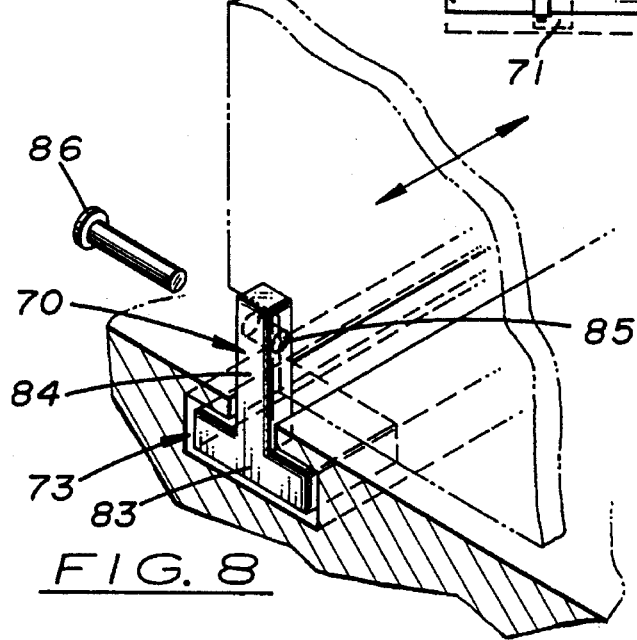

ADJUSTABLE VIEW-SHIELDING DEVICE

BACKGROUND OF THE INVENTION

1. Field of the Invention

The instant invention relates generally to security devices and, more particularly, to security devices used to prevent viewing of the inputting or outputting of private information from a device by people positioned behind or adjacent to the user of the device.

2. Description of the Related Art

Users of pay telephones and bank automatic teller machines (ATMs) are required to input private information into the machine using a touch pad or keypad, hereinafter referred to as a keypad. Often, inputted or outputted private information is displayed on the machine's monitor or viewing screen. In order to prevent other people positioned behind or adjacent to the user from viewing the keypad or viewing screen, the user must position his body or hand over the keypad or viewing screen. In some instances, using his body or hand to block the view of others in this manner may be difficult or socially awkward for the user.

SUMMARY OF THE INVENTION

It is an object of the present invention to provide a view-shielding device capable of blocking the view of the machine's keypad or viewing screen by others positioned behind or adjacent to the user.

It is another object of the present invention to provide such a device capable of being selectively adjusted to block different viewing angles by others positioned behind or adjacent to the user while allowing different viewing angles by different users.

It is a further object of the present invention to provide such a device that is easy to manufacture and easy to attach to machines currently on the market today.

To accomplish the above stated objects and other objects which will become apparent as this description proceeds, an adjustable view-shielding device for a machine is provided which is designed to block the view of the machine's keypad or viewing screen by other people positioned behind or adjacent to the user. The device comprises a pair of vertically aligned screens attached by a pivotal attachment means to the front surface of the machine on the opposite sides of the machine's keypad or viewing screen. In one embodiment, each screen comprises a single panel structure made of rigid, opaque material. The pivotal attachment means includes a pair of upper and lower hinges which pivotally attaches the panel structure's inside longitudinal edge to the front surface of the machine. The hinges allow each screen to pivot in a outward extended direction approximately 180 degrees. Each screen is also sufficient in length and width so that the keypad or viewing screen may be fully or substantially covered when the screens are pivoted over the keypad or viewing screen. In another embodiment disclosed herein, each screen includes a second panel structure pivotally attached to the outside longitudinal edge of the first panel structure. In still another embodiment disclosed herein, the hinges described above that are used to attach the first panel structures to the front surface of the machine are replaced with sliding hinges which enable the screens to be selectively moved transversely on the front surface of the machine thereby providing greater adjustment for view blocking effect.

BRIEF DESCRIPTION OF THE DRAWINGS

FIG. 1 is a perspective view of one embodiment of the view-shielding device used on a pay telephone.

FIG. 2 is a perspective view of the embodiment shown in FIG. 1 attached to the front surface of a monitor.

FIG. 3 is a side elevational view of the panel structure.

FIG. 4 is a top plan view of the upper hinge shown a portion of the first panel structure attached thereto.

FIG. 5 is a top plan view of another embodiment of the invention having a second panel structure attached to the first panel structure by a second pair of hinges.

FIG. 6 is a partial side elevational view of the second panel structure attached to the first panel structure.

FIG. 7 is a front plan view of another embodiment of the invention with the screens slidingly mounted on the front surface of the machine.

FIG. 8 is a sectional perspective view of the sliding hinge disposed in a horizontal slot formed on the front surface of the machine.

DESCRIPTION OF THE PREFERRED EMBODIMENT(S)

Shown in the accompanying FIGS. 1–7, there is shown an adjustable view-shielding device, generally referred to as 10, designed to block the view of a machine's keypad 80 or viewing screen 95 by other people positioned behind or adjacent to the user.

The device 10 comprises a pair of spaced apart, outward extended first and second screens 12, 22, respectively, which are vertically aligned in a parallel manner and pivotally attached to the front surface 8 of a machine, shown in FIG. 1 as a pay telephone 75, and shown in FIG. 2 as a monitor 90. In the first embodiment, shown in FIGS. 1–3, each screen 12, 22 includes a first panel structure 13, 23, respectively, made of rigid, opaque material. A pivotal attachment means is used to pivotally attach each first panel structure 13, 23 of screen 12, 22 respectively to the front surface 8 of the machine. In the preferred embodiment, the pivotal attachment means includes a pair of upper and lower hinges 30, 31 used to affix the left, first panel structure 13 to the front surface 8 and pair of upper and lower hinge 40, 41, used to affix the right, first panel structure 23 to the front surface 8 on opposite sides of the keypad 80 or the monitor's viewing screen 95. As shown more clearly in FIG. 4, each hinge (upper hinge 30 shown only) is "T" shaped with a central leg 32 and a perpendicularly aligned base leg 33. The central leg 32 extends horizontally from one end of the base leg 33 to approximately the base leg's mid-point. During assembly, the base leg 33 is aligned and attached to the front surface 8 of the machine on one side of the keypad 80 or viewing screen 95 so that the central leg 32 extends outward therefrom. Holes 34 are manufactured on the base leg 33 through which a suitable connector 35 may be inserted to affix the hinge to the front surface 8. A pair of upper and lower cutouts 14, 15, respectively, are manufactured near the upper and lower corners of each first panel structure which receive the distal end of the central leg 32. A longitudinally aligned bore 16 is manufactured on the inside surface of each cutout.

The two pairs of upper and lower hinges 30, 31 and 40, 41, respectively are vertically aligned and affixed to the front surface 8 on opposites of the keypad 80 or viewing screen 95. A longitudinally aligned bore 38 is formed in the central leg 32 in which a pin 39 may be disposed. During assembly, the bores 16 and 38 are aligned so that the pin 39 may be extended through to attach the hinges 30, 31, and 40, 41 to the first panel structures 13, 23, respectively.

The pairs of hinges 30, 31, and 40, 41 are properly positioned on the front surface 8 of the machine and the length and width of the screens 12, 22 are sufficient so that the keypad 80 or viewing screen 95 may be fully or substantially covered when the screens 12, 22 are pivoted to cover the keypad 80 or view screen 95.

In still another embodiment, shown in FIGS. 5 and 6, each screen 50, 60 includes a second panel structure 52, 62, respectively, pivotally attached along their inside longitudinal edges to the outside longitudinal edges of the adjacent first panel structures. A pair of hinges 54, 55, and 64, 65, is disposed between the adjacent longitudinal edges 18, 53, and 28, 63 to pivotally attached the first and second panel structures 13, 50, and 23, 60, respectively, together.

In another embodiment, the pairs of hinges 30, 31, and 40, 41 are replaced with sliding hinges 70, 71, and 77, 78. The sliding hinges 70, 71 and 77, 78 enable the screens 12, 22 to be spaced apart at different distances and adjusted horizontally over the front surface 8 of the machine. As shown in FIGS. 7 and 8, each sliding hinge (sliding hinge 70 is shown) is similar to hinge 30 described above and comprises a base leg 83 and a perpendicularly aligned central leg 84. The central leg 84 has a longitudinal aligned bore 85 manufactured therein through which a pin 86 may be inserted to attach the sliding hinge to the screen.

Manufactured on the front surface 8 of the machine are two, upper and lower horizontally aligned slots 73, 74 located above and below the keypad 80 or viewing screen. The slots 73, 74 have a cross-sectional shape complimentary to the sliding hinges 70, 71 so that the sliding hinges 70, 71 may move horizontally therein. By adjusting the position of the sliding hinges 70, 71 and 77, 78 on the front surface 8, the relative positions of the screens 12, 22 on the front surface 8 and their spacing may be adjusted by the user.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A view-shielding device for a machine having a keypad or viewing screen comprising:
   a. a machine having a keypad or viewing screen;
   b. a pair of screens each including a first panel structure made of opaque material capable of blocking the view of said keypad or viewing screen by others positioned behind or adjacent to a user of said machine; and,
   c. a pivotal attachment means pivotally attaching each said first panel structure in a parallel manner on the opposite sides of said keypad or viewing screen on said machine.

2. A view-shielding device as recited in claim 1, wherein each said screen further includes a second panel structure pivotally attached to said first panel structure, said second panel structure being traversely aligned in a side-by-side manner with said first panel structure and pivotally connected thereto.

3. A view-shielding device as recited in claim 1, wherein said pivotal attachment means includes a pair of hinges fixed in position on said machine on opposite sides of said keypad or viewing screen.

4. A view-shielding device as recited in claim 1, wherein said pivotal attachment means is horizontally adjustable on said machine.

5. A view-shielding device as recited in claim 4, wherein said pivotal attachment means includes upper and lower slots manufactured on said machine above and below said keypad or said viewing screen and at least one sliding hinge disposed therein, said sliding hinge capable of sliding in said slots thereby enabling said screens to be selectively moved transversely on said machine and over said keypad or said viewing screen.

6. A view-shielding device for a machine having a keypad or viewing screen comprising:
   a. a machine having a keypad or viewing screen;
   b. a first panel structure;
   c. a second panel structure; and,
   d. two pivotal attachment means capable of pivotally attaching each said first panel structure and said second panel structure in a parallel, longitudinally aligned position to said machine on opposite sides of said keypad or said viewing screen.

7. A view-shielding device as recited in claim 6, further including a second panel structure pivotally attached to said first panel structure, said second panel structure being traversely aligned in a side-by-side manner with said first panel structure and pivotally connected thereto.

8. A view-shielding device as recited in claim 6, wherein said pivotal attachment means are slidingly mounted on said machine above and below said keypad or said viewing screen thereby enabling said first and second panel structures to be to move transversely on said machine and over said keypad or said viewing screen.

9. A view-shielding device as recited in claim 8, further including a second panel structure pivotally attached to said first panel structure, said second panel structure being transversely aligned in a side-by-side manner with said first panel structure and pivotally connected thereto.

10. A view-shielding device for a machine having a keypad or viewing screen, comprising:
    a. a machine having a keypad or a viewing screen;
    b. two first panel structures pivotally attached to said machine proximate and on opposite sides of said keypad or monitor, said first panel structures being sufficient length and width to cover at least one-half of said keypad or viewing screen when pivoted thereover; and
    c. two second panel structures pivotally attached to said first panel structures, one said second panel structure being transversely connected in a side-by-side manner with one said first panel structure and pivotally connected thereto.

11. A view-shielding device as recited in claim 10, wherein said first panel structures are slidingly mounted on said machine above and below said keypad or said viewing screen thereby enabling said first and second panel structures to be moved transversely on said machine and over said keypad or said viewing screen.

\* \* \* \* \*